(12) United States Patent
Kwon et al.

(10) Patent No.: US 10,466,824 B2
(45) Date of Patent: Nov. 5, 2019

(54) DISPLAY PANEL HAVING OVERLAPPING ELECTRODE LINES AND DISPLAY DEVICE INCLUDING THE SAME

(71) Applicant: LG Display Co., Ltd., Seoul (KR)

(72) Inventors: Soonho Kwon, Seoul (KR); HongSung Song, Goyang-si (KR); YongGi Son, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/203,150

(22) Filed: Nov. 28, 2018

(65) Prior Publication Data

US 2019/0095022 A1    Mar. 28, 2019

Related U.S. Application Data

(63) Continuation of application No. 15/273,130, filed on Sep. 22, 2016, now Pat. No. 10,175,796.

(30) Foreign Application Priority Data

Sep. 24, 2015   (KR) .......................... 10-2015-0135746

(51) Int. Cl.
  *G06F 3/041*   (2006.01)
  *G06F 3/044*   (2006.01)
  (Continued)

(52) U.S. Cl.
  CPC ............ *G06F 3/0412* (2013.01); *G06F 3/044* (2013.01); *G06F 3/0416* (2013.01);
  (Continued)

(58) Field of Classification Search
  CPC .... G06F 3/0416; G06F 3/0418; G06F 3/0412; G06F 3/044; G02F 1/1343;
  (Continued)

(56) References Cited

U.S. PATENT DOCUMENTS

2006/0164350 A1    7/2006   Kim et al.
2014/0092036 A1    4/2014   Lin et al.
(Continued)

FOREIGN PATENT DOCUMENTS

| CN | 203894514 U | 10/2014 |
| CN | 104765506 A | 7/2015 |
| CN | 104793829 A | 7/2015 |

OTHER PUBLICATIONS

United States Office Action, U.S. Appl. No. 15/273,130, dated Mar. 29, 2018, 25 pages.

*Primary Examiner* — Darlene M Ritchie
(74) *Attorney, Agent, or Firm* — Fenwick & West LLP

(57) ABSTRACT

Disclosed is a display panel. The display panel includes a plurality of first electrodes, a plurality of second electrodes, a plurality of first electrode lines, and a plurality of second electrode lines. The first electrodes are provided in a display part and are used as a common electrode and a touch electrode. The second electrodes are used as the common electrode and each second electrode is disposed adjacent to at least one of the first electrodes. The first electrode lines extend to a non-display part disposed outside the display part and are each connected to a corresponding one of the first electrodes. The second electrode lines extend to the non-display part and are connected to at least two of the second electrodes and supply a common voltage to the second electrodes connected to the second electrode lines.

16 Claims, 8 Drawing Sheets

(51) Int. Cl.
*G09G 3/36* (2006.01)
*G02F 1/1343* (2006.01)
*G02F 1/1345* (2006.01)

(52) U.S. Cl.
CPC ......... *G09G 3/3648* (2013.01); *G02F 1/1343* (2013.01); *G02F 1/1345* (2013.01); *G06F 3/0443* (2019.05); *G09G 2354/00* (2013.01)

(58) Field of Classification Search
CPC ............. G02F 1/134309; G02F 1/1345; G02F 1/13338; G02F 1/134363; G02F 1/136286; G09G 3/3648; G09G 2354/00
See application file for complete search history.

(56) References Cited

U.S. PATENT DOCUMENTS

| | | |
|---|---|---|
| 2014/0168149 A1 | 6/2014 | Han et al. |
| 2014/0184560 A1 | 7/2014 | Adachi |
| 2014/0293159 A1 | 10/2014 | Adachi |
| 2015/0370380 A1 | 12/2015 | Hong et al. |
| 2016/0266694 A1 | 9/2016 | Lee et al. |
| 2016/0293124 A1 | 10/2016 | Xin et al. |
| 2016/0327834 A1 | 11/2016 | Yu et al. |
| 2016/0328055 A1* | 11/2016 | Wu ........................ G09G 5/003 |
| 2016/0349889 A1 | 12/2016 | Yang et al. |
| 2016/0364069 A1 | 12/2016 | Tsai et al. |
| 2016/0370919 A1 | 12/2016 | Xu et al. |
| 2017/0046003 A1 | 2/2017 | Huang et al. |
| 2017/0115769 A1 | 4/2017 | Ding et al. |
| 2017/0205955 A1 | 7/2017 | Yang et al. |
| 2017/0269746 A1 | 9/2017 | He et al. |
| 2017/0315664 A1 | 11/2017 | Ishizaki et al. |

\* cited by examiner

DISPLAY PANEL HAVING OVERLAPPING ELECTRODE LINES AND DISPLAY DEVICE INCLUDING THE SAME

CROSS-REFERENCE TO RELATED APPLICATIONS

This application is a continuation of U.S. patent application Ser. No. 15/273,130 filed on Sep. 22, 2016 which claims the benefit of the Korean Patent Application No. 10-2015-0135746 filed on Sep. 24, 2015, each of which is hereby incorporated by reference in its entirety.

BACKGROUND

Field of Technology

The present disclosure relates to a display panel and a display device including the same, which include a built-in touch panel.

Discussion of the Related Art

A touch panel is a type of input device, which is included in display devices such as liquid crystal display (LCD) devices, organic light emitting display devices, etc., and enables a user to input information by directly touching a screen with a finger, a pen, or the like while looking at the screen of a display device.

Recently, the demand for in-cell type display devices each including a plurality of elements which configure a touch panel and are built into a display panel for slimming portable terminals such as smartphones, tablet personal computers (PCs), etc. is increasing.

FIG. 1 is an exemplary diagram illustrating a configuration of a related art in-cell type display device, and particularly, is an exemplary diagram illustrating a configuration of an in-cell type display device where driver integrated circuits (ICs) are disposed in an upper end and a lower end of a display panel. The display panel configuring the in-cell type display device is referred to as an in-cell type display panel.

The in-cell type display panel may be categorized into a self-capacitance type and a mutual-capacitance type. In FIG. 1, an in-cell type display panel 10 using the self-capacitance type is illustrated. A plurality of touch electrodes 20 are provided in the in-cell type display panel 10 using the self-capacitance type. The touch electrodes 20 are each used as a common electrode.

Generally, an in-cell type display panel using a self-capacitance type is applied to small terminals such as mobile terminals, notebook computers, monitors, etc. In the small terminals, since the number of touch electrodes is small, the display panel may be driven by a driver IC disposed on one side of the display panel.

However, if a size of the in-cell type display panel using the self-capacitance type is enlarged, the number of touch electrodes increases exponentially. The number of driver ICs increases by an increase in number of the touch electrodes. Therefore, as illustrated in FIG. 1, one or more driver ICs 40 are disposed in each of an upper end and a lower end of the in-cell type display panel 10 applied to a large in-cell type display device. The one or more driver ICs 40 are attached on a flexible printed circuit board (FPCB) 30, and the FPCB 30 is connected to a main board (not shown).

The touch electrodes 20 disposed in an upper end of a center portion L of the in-cell type display panel 10 are connected to the driver IC 40, disposed in the upper end of the in-cell type display panel 10, through touch lines 21. The touch electrodes 20 disposed in a lower end of the center portion L of the in-cell type display panel 10 are connected to the driver IC 40, disposed in the lower end of the in-cell type display panel 10, through other touch lines 21.

In a related art display device, as described above and illustrated in FIG. 1, each of the touch electrodes 20 is connected to a corresponding touch line 21, and the touch lines 21 are connected to the driver IC 40.

As a size of a display device is enlarged, the number of the touch electrodes 20 and the number of the touch lines 21 increase exponentially.

As the number of the touch lines 21 increases, a transmittance of the display panel 10 is reduced.

As the number of the touch lines 21 increases, the number of the driver ICs 40 which supply touch signals to the touch electrodes 20 and receive sensing signals from the touch electrodes 20 increases.

In order not to increase the number of the driver ICs 40, the number of pins of the driver ICs 40 should increase, and to this end, a structure of each of the driver ICs 40 should be modified.

SUMMARY

Accordingly, the present disclosure is directed to provide a display panel and a display device including the same that substantially obviate one or more problems due to limitations and disadvantages of the related art.

An aspect of the present disclosure is directed to provide a display panel and a display device including the same, in which first electrodes used as common electrodes and touch electrodes and second electrodes used as common electrodes are alternately arranged.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a display panel including a plurality of first electrodes provided in a display part of the display panel for displaying an image, the plurality of first electrodes used as a common electrode for displaying the image and the plurality of first electrodes used as a touch electrode for sensing touch; a plurality of second electrodes disposed adjacent to at least one of the plurality of first electrodes, the plurality of second electrodes used as a common electrode; a plurality of first electrode lines extending to a non-display part of the display panel that is disposed outside of the display part, each of the plurality of first electrode lines connected to a corresponding one of the plurality of first electrodes; and a plurality of second electrode lines extending to the non-display part, each of the plurality of second electrode lines connected to at least two of the plurality of second electrodes.

In another aspect of the present disclosure, there is provided a display device including a display panel, a driving circuit unit, and a controller. The display panel includes a display part displaying an image and a non-display part disposed outside the display part and not displaying an image. The driving circuit unit supplies a common voltage to at least one first electrode and at least one second electrode during an image display period, and supplies a touch signal to the at least one first electrode during a touch sensing period and refraining from supplying the touch signal to the at least one second electrode during the touch sensing period. The controller drives the driving circuit unit. The display panel includes a plurality of first electrodes, a plurality of second electrodes, a plurality of first electrode lines, and a plurality of second electrode lines. The plurality of first electrodes are provided in a display part of the display panel and the plurality of first electrodes are used as a common electrode for displaying the image during image display period. The plurality of first electrodes are used as a touch electrode for sensing touch during the touch sensing period. The plurality of second electrodes are disposed adjacent to at least one of the plurality of first electrodes. The plurality of second electrodes used as a common electrode during the image display period. The plurality of first electrode lines extend to a non-display part of the display panel that is disposed outside of the display part. Each of the plurality of first electrode lines connected to a corresponding one of the plurality of first electrodes. The plurality of second electrode lines extend to the non-display part. Each of the plurality of second electrode lines are connected to at least two of the plurality of second electrodes.

In another aspect of the present disclosure, there is provided a display panel comprising: a plurality of first electrodes provided in a display part of the display panel for displaying an image, the plurality of first electrodes used as a common electrode for displaying the image during a display period and the plurality of first electrodes used as a touch electrode for sensing touch during a touch sensing period; a plurality of second electrodes provided in the display part, the plurality of second electrodes used as a common electrode during the display period for displaying the image; wherein the plurality of first electrodes are electrically isolated from each other and the plurality of second electrodes are electrically connected to each other.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
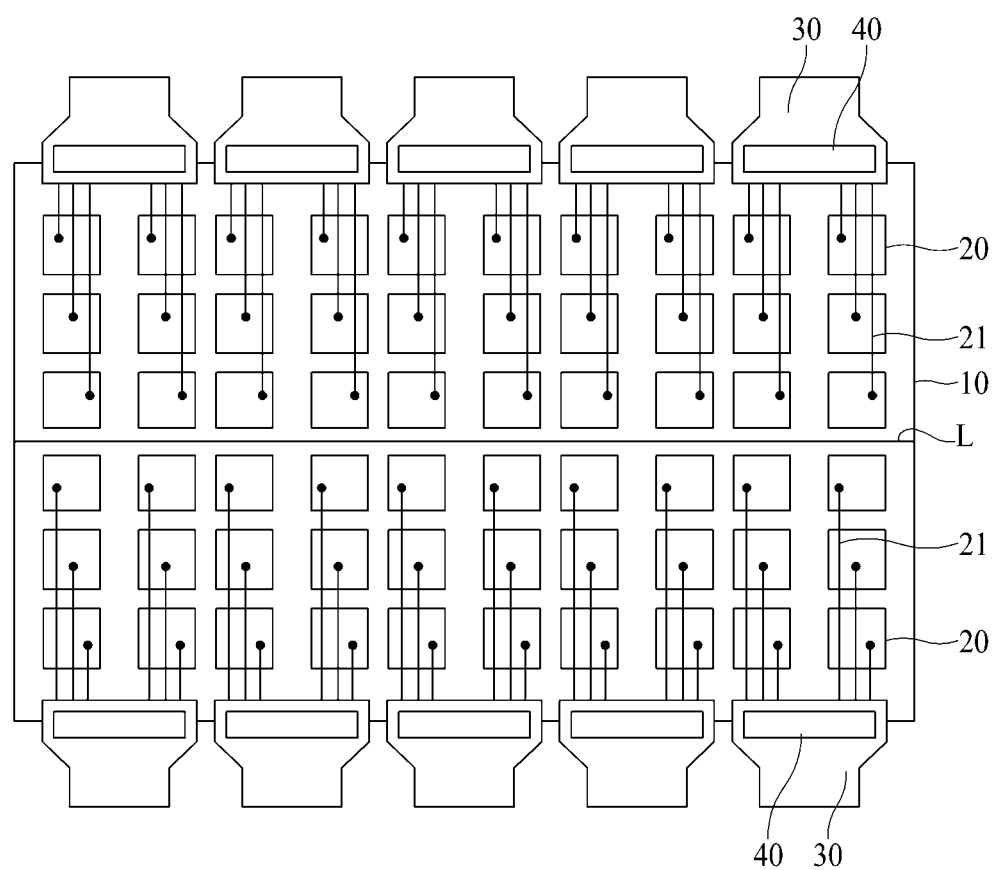
FIG. 1 is an exemplary diagram illustrating a configuration of a related art in-cell type display device.

Reference will now be made in detail to the exemplary embodiments of the present disclosure, examples of which are illustrated in the accompanying drawings. Wherever possible, the same reference numbers will be used throughout the drawings to refer to the same or like parts.

Hereinafter, embodiments of the present disclosure will be described in detail with reference to the accompanying drawings. In this disclosure below, for convenience of a description, a LCD device will be described as an example of the present disclosure, but the present disclosure is not limited thereto. That is, the present disclosure may be applied to various display devices that display an image by using a common electrode and a common voltage.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

In the specification, in adding reference numerals for elements in each drawing, it should be noted that like reference numerals already used to denote like elements in other drawings are used for elements wherever possible.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over·', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Figure 2:
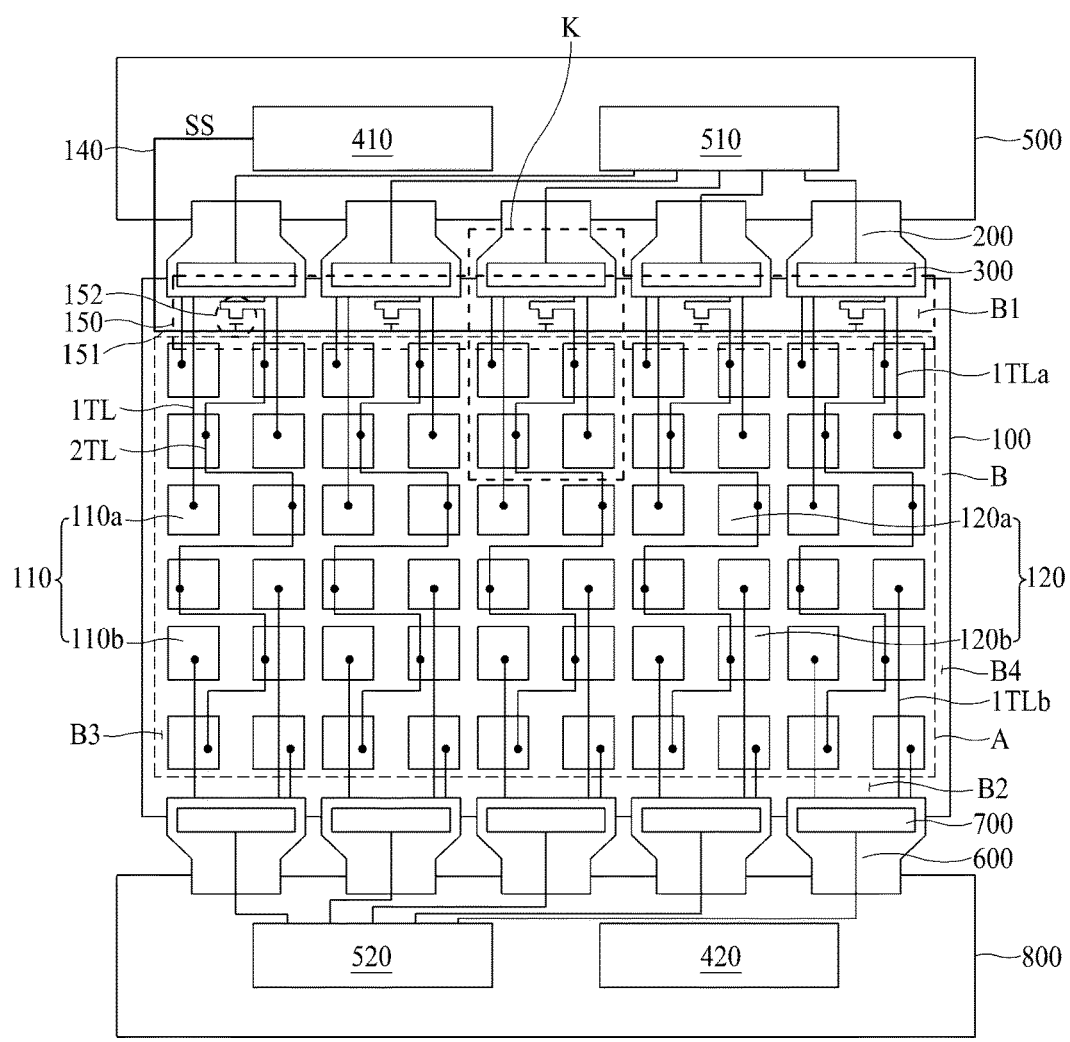
FIG. 2 is an exemplary diagram illustrating a configuration of a display device according to an embodiment of the present disclosure.
Figure 3:
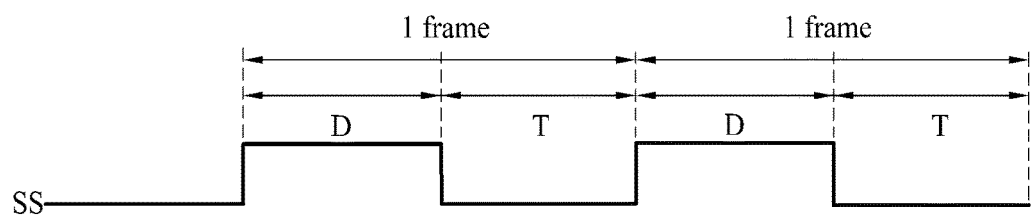
FIG. 3 is an exemplary diagram showing a waveform of a switching signal applied to the display device according to an embodiment of the present disclosure.
Figure 4:
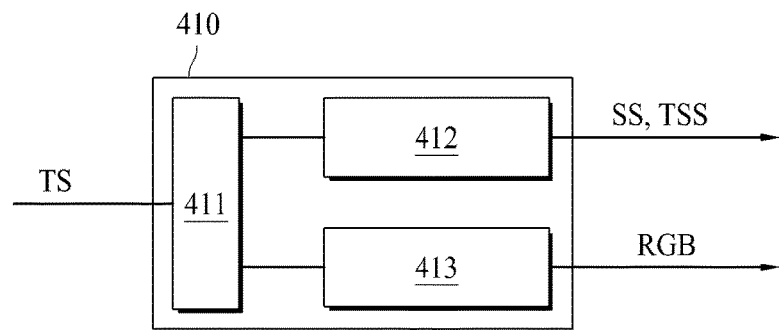
FIG. 4 is an exemplary diagram illustrating a configuration of a controller applied to the display device according to an embodiment of the present disclosure.
Figure 5:
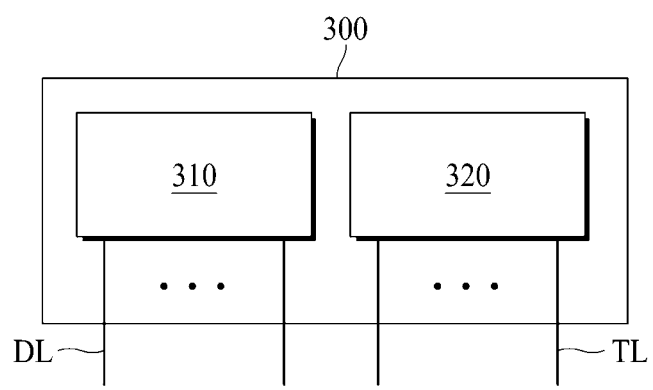
FIG. 5 is an exemplary diagram illustrating a configuration of a driver IC applied to the display device according to an embodiment of the present disclosure.
Figure 6:
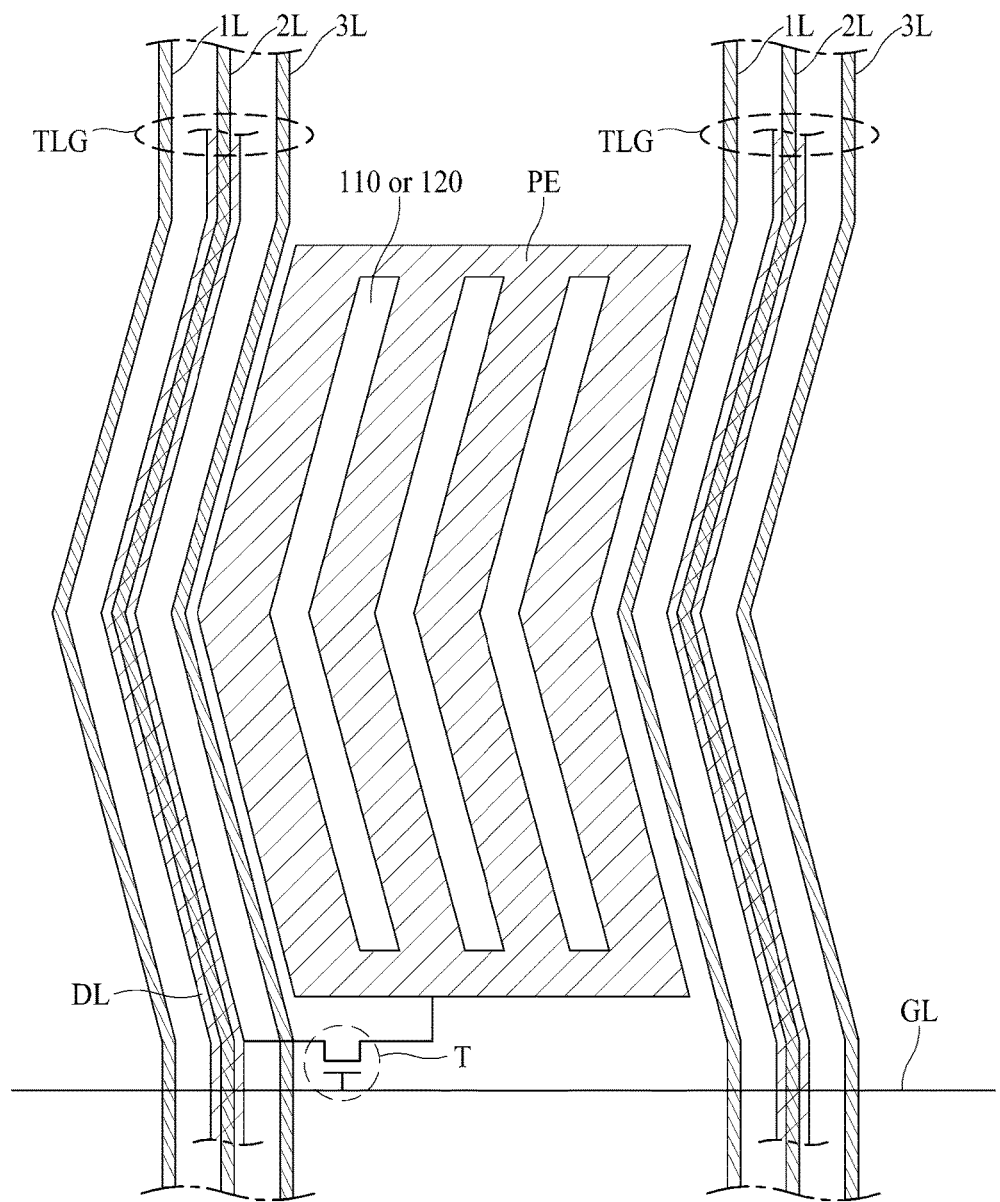
FIG. 6 is an exemplary diagram schematically illustrating a configuration of a pixel applied to the display device according to an embodiment of the present disclosure.

FIG. 2 is an exemplary diagram illustrating a configuration of a display device according to an embodiment of the present disclosure. FIG. 3 is an exemplary diagram showing a waveform of a switching signal applied to the display device according to an embodiment of the present disclosure. FIG. 4 is an exemplary diagram illustrating a configuration of a controller applied to the display device according to an embodiment of the present disclosure. FIG. 5 is an exemplary diagram illustrating a configuration of a driver IC applied to the display device according to an embodiment of the present disclosure. FIG. 6 is an exemplary diagram schematically illustrating a configuration of a pixel applied to the display device according to an embodiment of the present disclosure. Here, particularly, FIG. 4 illustrates a first controller 410, and FIG. 5 illustrates a first driver IC 300.

The display device according to an embodiment of the present disclosure, as illustrated in FIG. 2, may include: a display panel 100 that includes a display part A displaying an image and a non-display part B disposed outside the display part A (e.g., around the display part A); a driver IC that supplies a common voltage to at least one first electrode and at least one second electrode during an image display period, and in a touch sensing period, supplies a touch signal to at least one first electrode; a controller that drives the driver IC; and a gate driver (not shown) that is driven by the controller to sequentially output a gate pulse to a plurality of gate lines included in the display panel 100. The driver IC described below may be referred to as a driving circuit unit.

The display panel 100 may include a plurality of first electrodes 110 that are provided in the display part A and are used as common electrodes and touch electrodes, a plurality of second electrodes 120 that are disposed adjacent to at least one first electrode 110, a plurality of first electrode lines 1TL that extend to the non-display part B where each of the first electrode lines 1TL is connected to a corresponding one of the first electrodes 110, and a plurality of second electrode lines 2TL that extend to the non-display part B and are connected to at least two of the second electrodes 120 to supply a common voltage. Since each of the first electrodes 110 is connected to a single first electrode line 1TL, the first electrodes 110 are electrically isolated from each other. In contrast, since a plurality of the second electrodes 120 are connected to a single second electrode line 2TL, the second electrodes 120 that are connected to the single second electrode line 2TL are electrically connected to each other.

The display panel 100 may include a first substrate, a second substrate on which the plurality of gate lines and a plurality of data lines DL are arranged, and a liquid crystal injected between the first substrate and the second substrate.

A touch panel configured with the first electrodes 110 may be built into the display panel 100. Here, the first electrodes 110 configuring the touch panel may perform a function of a common electrode supplied with the common voltage or may perform a function of a touch electrode supplied with the touch signal.

The display panel 100 may include the second electrodes 120. The second electrodes 120 may be disposed adjacent to at least one first electrode 110. For example, the second electrodes 120 and the first electrodes 110 may be alternately arranged in a vertical direction and a lateral direction. Each of the second electrodes 120 may be used only as the common electrode supplied with the common voltage.

For example, in the image display period, the common voltage may be supplied to the first electrodes 110 and the second electrodes 120, a data voltage may be supplied to, through a corresponding data line, a pixel electrode included in each of a plurality of pixels, and a gate pulse may be supplied to the gate lines. When the gate pulse is supplied, the liquid crystal may be driven by a difference voltage between the common voltage and the data voltage supplied to the pixel electrode. A transmittance of the liquid crystal may vary according to the difference voltage, and thus, an image may be displayed by the display panel 100.

In the touch sensing period, the touch signal may be supplied to the first electrodes 110, but the touch signal is not provided to the second electrodes 120. At this time, the driver IC may receive the sensing signals from the first electrodes 110. To this end, the driver IC may be provided in plurality, and each of the plurality of driver ICs may include a touch receiver. In FIG. 5, a first touch receiver 320 included in a first driver IC 300 among the first driver IC 300 and a second driver IC 700 illustrated in FIG. 2 is illustrated. The second driver IC 700 may include a second touch receiver.

Each of the first touch receiver 320 and a second touch receiver may determine whether the display panel 100 is touched or may detect a touched position, based on the sensing signals.

Moreover, each of the first touch receiver 320 and the second touch receiver may transfer the sensing signals to a touch sensing unit (not shown) that determines whether the display panel 100 is touched or detects a touched position, based on the sensing signals. In this case, the touch sensing unit may be mounted on at least one of main boards 500 and 800 illustrated in FIG. 2.

In the present embodiment, as described above and illustrated in FIG. 2, the second electrodes 120 may be disposed adjacent to at least one first electrode 110. That is, each of the first electrodes 110 and each of the second electrodes 120 are alternately arranged in a plurality of rows in the display panel such that each of the second electrodes 120 is adjacent to at least two of the plurality of first electrodes in the display panel as shown in FIG. 2. For example, the second electrodes 120 and the first electrodes 110 may be alternately arranged in the vertical direction and the lateral direction, and each of the second electrodes 120 may be used as only the common electrode supplied with the common voltage. Thus, the second electrodes 120 do not function as a touch electrode.

Therefore, whether there is a touch cannot be determined despite touching a position at which each of the second electrodes 120 is disposed.

In order to solve such a problem, in the present embodiment, whether a touch occurs in each of the second electrodes 120 may be determined by using various kinds of touch determination algorithms well known to those skilled in the art.

For example, in the present embodiment, whether there is a touch may be determined by using a capacitance. It is assumed that when a touch occurs in the first electrode 110, a value extracted based on the sensing signals may be 1, and when a touch does not occur in the first electrode 110, the value extracted based on the sensing signals may be 0.

Therefore, if a value extracted based on a sensing signal received from one of the first electrodes 110 is 1, the first touch receiver 320 or the touch sensing unit may determine that the one first electrode 110 from which the sensing signal is received is touched.

In this case, when one of the second electrodes 120 is touched, sensing signals received from some first electrodes 110 disposed near the one second electrode 120 may be affected by the touch. Therefore, a value extracted based on the sensing signals received from some first electrodes 110 disposed near the one second electrode 120 may be a value which is greater than 0 and less than 1. In this case, as a position becomes closer to some first electrodes 110 disposed near the touched one second electrode 120, the value may become closer to 1.

Therefore, the first touch receiver 320 or the touch sensing unit may determine that the one second electrode 120 is touched, based on a pattern of the sensing signals.

To provide an additional description, in the present embodiment, by using only the first electrodes 110, whether there is a touch may be determined for the whole portion of the display panel 100, and to this end, various methods well known to those skilled in the art may be used.

A red color filter defining a red pixel, a green color filter defining a green pixel, and a blue color filter defining a blue pixel may be provided on the first substrate. Alternatively, the color filters may be provided on the second substrate.

The gate lines, the data lines, the first electrodes 110, the second electrodes 120, and a plurality of pixel electrodes (not shown) may be provided on the second substrate.

Particularly, the first electrodes 110 and the second electrodes 120 may be provided in the display part A displaying an image in the display panel 100.

The non-display part B may be disposed outside the display part A.

The controller may receive a timing signal TS, including a data enable signal, a dot clock, etc., from an external system to generate control signals for controlling an operation timing of each of the driver ICs 300 and 700 and the gate driver (not shown)

The controller may realign input video data received from the external system to output image data, generated through the realignment, to the driver ICs 300 and 700.

The controller, as illustrated in FIG. 2, may be mounted on each of the different main boards 500 and 800. In this case, a first controller 410 may control the first driver IC 300, and a second controller 420 may control the second driver IC 700. The first controller 410 and the second controller 420 may be synchronized with each other by a synchronization signal.

However, one controller may control all of the first driver IC 300 and the second driver IC 700.

Hereinafter, a display device where the first controller 410 controls the first driver IC 300 and the second controller 420 controls the second driver IC 700 will be described as an example of the present disclosure. In this case, configurations and functions of the first controller 410 and the second controller 420 may be the same, and the first controller 410 and the second controller 420 may be synchronized with each other by the synchronization signal. Thus, the first controller 410 will be described below.

The first controller 410 may generate a control signal (e.g., a touch synchronization signal TSS) for controlling an operation timing of the first driver IC 300 and may transfer the control signal to the first driver IC 300.

The first driver IC 300 may differentiate the image display period and the touch sensing period according to the touch synchronization signal TSS.

Moreover, the first controller 410 may generate a switching signal SS and may supply the switching signal SS to a switching line 151 through a switching signal supply line 140.

The switching signal SS may be a signal which is the same as or different from the touch synchronization signal TSS.

The switching signal SS may have a waveform shown in FIG. 3. For example, in an image display period D of one frame, the switching signal SS may turn on a plurality of switching transistors 152 connected to the switching line 151, and in a touch sensing period T of the one frame, the switching signal SS may turn off the switching transistors 152.

To this end, as shown in FIG. 3, the switching signal SS may include a high-level pulse and a low-level pulse.

The switching signal SS may be output from the first controller 410, or may be output from the second controller 420. Also, the first controller 410 and the second controller 420 may all output the switching signal SS.

In order to perform the above-described function, as illustrated in FIG. 4, the first controller 410 may include an input unit 411, a control signal generator 412, and an aligner 413.

The input unit 411 may receive the timing signal TS and the input video data.

The control signal generator 412 may generate the touch synchronization signal TSS, the switching signal SS, a data control signal for controlling the first driver IC 300, and a gate control signal for controlling the gate driver by using the timing signal TS.

The aligner 413 may realign the input video data received from the external system to output image data RGB, generated through the realignment, to the first driver IC 300.

The driver IC may supply the common voltage to at least one first electrode 110 and at least one second electrode 120 during the image display period, and during the touch sensing period, the driver IC may supply the touch signal to at least one first electrode 110. For example, the driver IC may supply the common voltage or the touch signal to the first electrodes 110 which are included in the display panel 100 and are used as the common electrodes, and may supply the common voltage to the second electrodes 120 included in the display panel 100. As described above, the driver IC described below may be referred to as a driving circuit unit.

The driver IC may be equipped in each of two or more the display panels 100.

Particularly, as illustrated in FIG. 2, the driver IC may be disposed in each of a first non-display area B1 of the non-display part B, which is disposed in an upper end of the display panel 100, and a second non-display area B2 of the non-display part B facing the first non-display area B1.

A driver IC disposed in the first non-display area B1 may be referred to as a first driver IC 300, and a driver IC disposed in the second non-display area B2 may be referred to as a second driver IC 700.

One or more first driver ICs 300 may be provided, and the one or more first driver ICs 300 may be disposed in the first non-display area B1. One or more second driver ICs 700 may be provided, and the one or more second driver ICs 700 may be disposed in the second non-display area B2.

The present disclosure may be applied to small or large display devices. In the small display devices, the driver IC may be disposed in only one of the first non-display area B1 and the second non-display area B2.

Even in the large display devices, the driver IC may be disposed in only one of the first non-display area B1 and the second non-display area B2. However, in order to enhance the quality of an image, as illustrated in FIG. 2, the large display devices may each include the first driver IC 300 provided in the first non-display area B1 and the second driver IC 700 provided in the second non-display area B2.

Hereinafter, for convenience of description, a display device configured as illustrated in FIG. 2 will be described as an example of the present disclosure. In FIG. 2, five first driver ICs 300 may be disposed in the first non-display area B1, and five second driver ICs 700 may be disposed in the second non-display area B2.

The first driver IC 300 may supply the common voltage or the touch signal to the first electrodes 110 which are included in the display panel 100 and are used as the touch electrodes.

The first driver IC 300 may be provided in the first non-display area B1. In one embodiment, the second non-display area B2 which configures the non-display part B and the first non-display area B1 face each other. For example, as illustrated in FIG. 2, the non-display part B may be disposed outside the display part A and may include the first non-display area B1, the second non-display area B2, a third non-display area B3, and a fourth non-display area B4. Here, the first non-display area B1 and the second non-display area B2 may face each other, and third non-display area B3 and the fourth non-display area B4 may face each other.

The first non-display area B1 may be disposed on one side of the display part A, for example, an upper side of the display part A illustrated in FIG. 2.

In this case, the first electrodes 110 may be divided into a plurality of first upper electrodes 110a disposed on an upper side with respect to a center portion of the display part A and a plurality of first lower electrodes 110b disposed on a lower side with respect to the center portion of the display part A.

The first electrode lines 1TL may be divided into a plurality of first upper electrode lines 1TLa disposed on an upper side with respect to the center portion and a plurality of first lower electrode lines 1TLb disposed on a lower side with respect to the center portion.

The first upper electrode lines 1TLa connected to the first upper electrodes 110a may be connected to the first driver IC 300 in the first non-display area B1.

The second non-display area B2 may be disposed on the other side of the display part A, for example, a lower side of the display part A illustrated in FIG. 2.

The first lower electrode lines 1TLb connected to the first lower electrodes 110b may be connected to the second driver IC 700 in the second non-display area B2.

The first driver IC 300 may be mounted on a first flexible board 200. The first flexible board 200 may be electrically connected to a first main board 500. A first common voltage supply unit 510 supplying the common voltage may be disposed on the first main board 500.

The second driver IC 700 may supply the common voltage or the touch signal to the first lower electrodes 110b which are included in the display panel 100 and are used as the common electrodes and touch electrodes. The second driver IC 700 may be disposed in the second non-display area B2.

The second driver IC 700 may be mounted on a second flexible board 600. The second flexible board 600 may be electrically connected to a second main board 800. A second common voltage supply unit 520 supplying the common voltage may be disposed on the second main board 800.

As illustrated in FIG. 5, the first driver IC 300 may include a first data driver 310 and a first touch receiver 320, and the second driver IC 700 may include a second data driver and a second touch receiver.

Configurations and functions of the first driver IC 300 and the second driver IC 700 may be the same. Hereinafter, a configuration and a function of the first driver IC illustrated in FIG. 5 will be described. Thus, the configurations and functions of the first driver IC 300 described below may be applied to the second driver IC 700.

As described above, the first driver IC 300 may include the first data driver 310 and the first touch receiver 320.

The first data driver 310 and the first touch receiver 320 may be driven by the touch synchronization signal TSS.

In the image display period, the first data driver 310 may convert the image data input from the first controller 410 into analog data voltages and may respectively supply the data voltages for one horizontal line to the data lines DL at every one horizontal period where the gate pulse is supplied to a corresponding gate line.

In the image display period, the first touch receiver 320 may supply the common voltage to the first upper electrodes 110a through the first upper electrode lines 1TLa. In the image display period, the second touch receiver may supply the common voltage to the first lower electrodes 110b through the first lower electrode lines 1TLb.

In the touch sensing period, the first touch receiver 320 may supply the touch signal to the first upper electrodes 110a through the first upper electrode lines 1TLa.

In the touch sensing period, the second touch receiver may supply the touch signal to the first lower electrodes 110b through the first lower electrode lines 1TLb.

In the touch sensing period, the first data driver 310 may supply a touch auxiliary signal, which has the same phase and potential difference as those of the touch signal, to the data lines DL.

In the touch sensing period, the first touch receiver 320 may supply the touch signal to the first upper electrodes 110a and then may receive sensing signals from the first upper electrodes 110a.

The first touch receiver 320 may convert the sensing signals into digital sensing signals, and by using the digital sensing signals, the first touch receiver 320 may determine whether the display panel 100 is touched and may detect a touched position. Also, as described above, the first touch receiver 320 may transfer the digital sensing signals to the touch sensing unit. By using the digital sensing signals, the touch sensing unit may determine whether the display panel 100 is touched and may detect a touched position.

As described above, whether the second electrodes 120 are touched may be determined by analyzing sensing signals received from the first electrodes 110. In this case, various kinds of touch analysis methods well known to those skilled in the art may be used.

The gate driver (not shown) may shift a gate start pulse transferred from the first controller 410 or the second controller 420 according to a gate shift clock to sequentially supply the gate pulse to the gate lines.

In the touch sensing period, the gate driver may supply the touch auxiliary signal to the gate lines.

The gate driver may be configured as an IC and may be mounted in the non-display part B of the display panel 100 or may be built into the display panel 100.

As described above, the first upper electrode lines 1TLa may extend to the first non-display area B1 of the non-display part B and may be connected to the first upper electrodes 110a in a one-to-one correspondence relationship. Therefore, one first upper electrode line 1TLa may be connected to one first upper electrode 110a.

Moreover, as described above, the first lower electrode lines 1TLb may extend to the second non-display area B2 of the non-display part B and may be connected to the first lower electrodes 110b in a one-to-one correspondence relationship. Therefore, one first lower electrode line 1TLb may be connected to one first lower electrode 110b.

To provide an additional description, the first electrode lines and the first electrodes 110 may be connected to each other in a one-to-one correspondence relationship.

The second electrode lines 2TL may extend to the non-display part B and may be connected to at least two of the second electrodes 120. In the image display period, the common voltage may be supplied to the second electrodes 120.

In the image display period, the first driver IC 300 may supply the common voltage to the first electrodes 110 through the first upper electrode lines 1TLa.

Therefore, in the image display period, the common voltage may be supplied to all of the first electrodes 110 and the second electrodes 120 provided in the display part A.

In this case, the number of the first upper electrode lines 1TLa connected to the first driver IC 300 may be smaller than the number of the touch lines 21 connected to the driver IC 40 applied to the related art display device illustrated in FIG. 1.

For example, the number of the driver ICs 40 included in the display panel 10 illustrated in FIG. 1 may be the same as the number of the driver ICs 300 and 700 included in the display panel 100 illustrated in FIG. 2, and the number of the touch electrodes 20 included in the display panel 10 illustrated in FIG. 1 may be the same as a sum of the number of the first electrodes 110 and the number of the second electrodes 120 included in the display panel 100 illustrated in FIG. 2. Also, a fundamental structure of the display panel 100 illustrated in FIG. 2 may be the same as that of the display panel 10 illustrated in FIG. 1. That is, a structure of the display panel 100 illustrated in FIG. 2 is identical to the structure of the display panel 10 illustrated in FIG. 1.

In this case, six touch lines 21 may be connected to one driver IC 40 illustrated in FIG. 1. However, three first upper electrode lines 1TLa and one second electrode line 2TL may be connected to one first driver IC 300 illustrated in FIG. 2.

Therefore, according to the present embodiment, in comparison with the related art display device, by using a small number of driver ICs, whether there is a touch may be determined for a whole portion of a display panel.

Each of the plurality of pixels included in the display panel 100 may be configured as illustrated in FIG. 6. Each of the pixels, as illustrated in FIG. 6, may include the first electrode 110 or the second electrode 120 supplied with the common voltage, a pixel electrode PE, a data line DL, a gate line GL, and a driving transistor T. The driving transistor T may be connected to the data line DL and the pixel electrode PE, and a gate of the driving transistor T may be connected to the gate line GL.

The first electrode line 1TL and the second electrode line 2TL may be disposed to overlap the data line DL. In FIG. 6, a line referred to by reference numeral TLG may be referred to as an electrode line group. The electrode line group TLG may be the first electrode line 1TL or the second electrode line 2TL, or may include the first electrode line 1TL and the second electrode line 2TL.

For example, the electrode line group TLG may be provided in an area of the display panel 100 overlapping the data line DL. The electrode line group TLG may include two or more auxiliary electrode lines. In FIG. 6, a plurality of electrode line groups TLG including three auxiliary electrode lines 1L, 2L and 3L are illustrated. Hereinafter, a display device where one electrode line group TLG includes the three auxiliary electrode lines 1L, 2L and 3L will be described as an example of the present disclosure.

The electrode line group TLG, as described above, may be used as the first electrode line 1TL.

Moreover, since the electrode line group TLG is included in all the pixels, an electrode line group TLG which is not used as the first electrode line 1TL may be used as the second electrode line 2TL.

Moreover, at least one of the auxiliary electrode lines 1L, 2L and 3L configuring the electrode line group TLG may be used as the first electrode line 1TL, and the other auxiliary electrode line may be used as the second electrode line 2TL.

Figure 7:
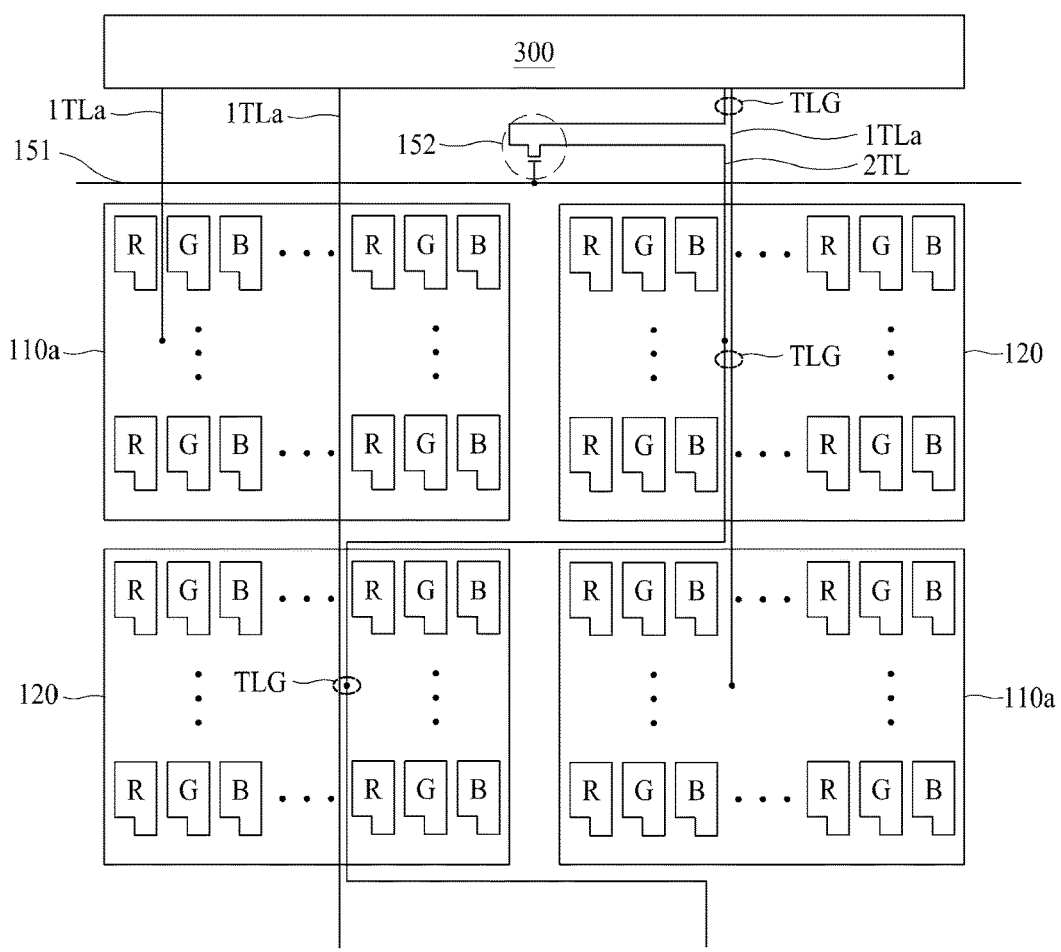
FIG. 7 is an exemplary diagram illustrating a configuration of a display panel according to an embodiment of the present disclosure.
Figure 8:
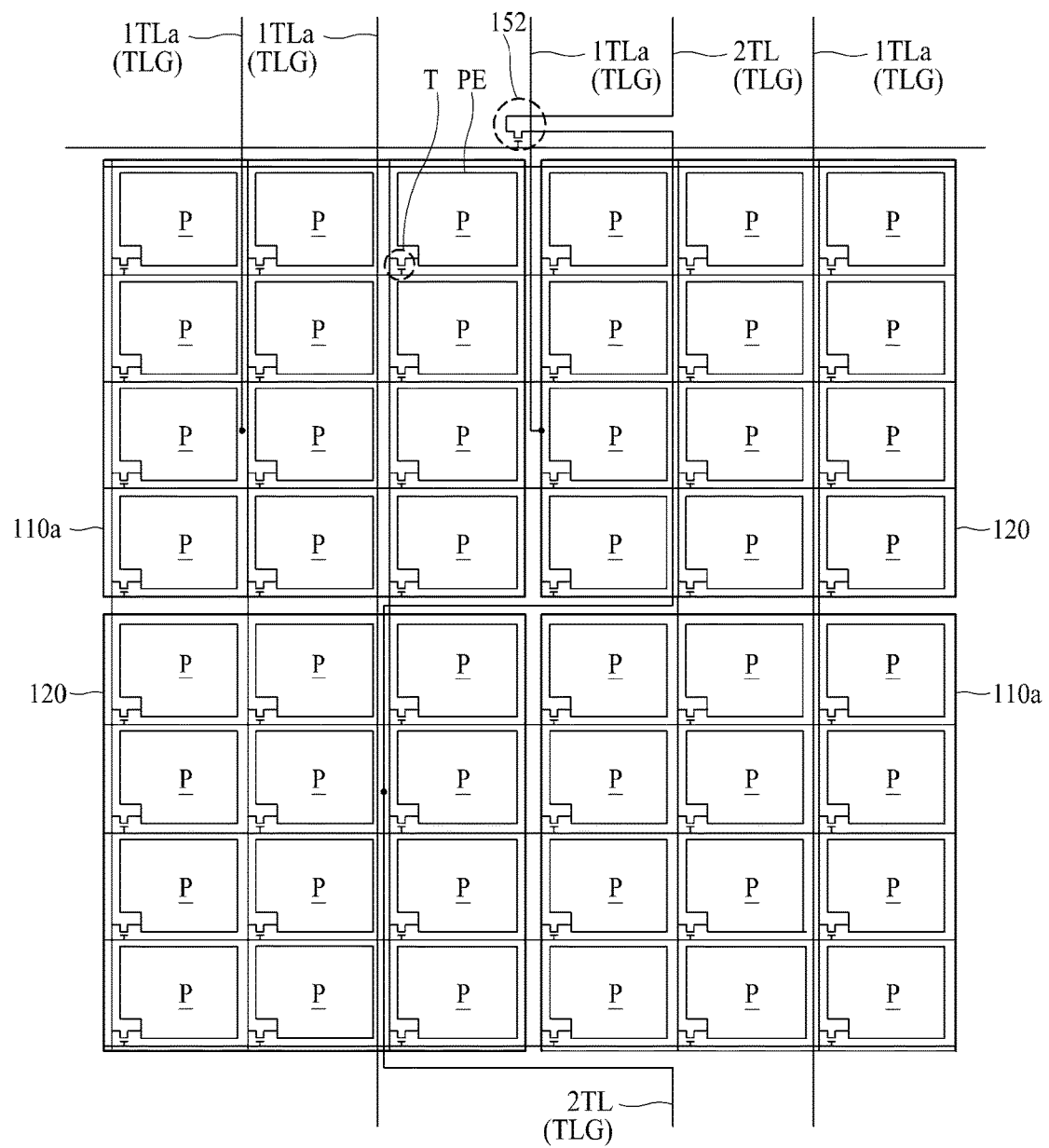
FIG. 8 is an exemplary diagram illustrating in detail the display panel illustrated in FIG. 7 according to an embodiment of the present disclosure.

FIG. 7 is an exemplary diagram illustrating a configuration of a display panel according to an embodiment of the present disclosure. FIG. 8 is an exemplary diagram illustrating in detail the display panel illustrated in FIG. 7. Particularly, FIG. 7 is an exemplary diagram illustrating a K area illustrated in FIG. 2, and FIG. 8 is an exemplary diagram illustrating FIG. 7 in detail. Also, FIGS. 2, 7 and 8 illustrate a display panel according to a first embodiment of the present disclosure.

The display panel 100 according to the present embodiment may include the display part A displaying an image and the non-display part B disposed outside the display part A.

A switching unit 150 may be provided in an area where the second electrode lines 2TL are provided in the non-display part B. For example, in FIG. 2, the display device where the second electrode lines 2TL are connected to the first driver IC 300 in the first non-display area B1 and the switching unit 150 is provided in the first non-display area B1 is illustrated as an example of the present disclosure.

The second electrode lines 2TL may be connected to the second driver IC 700 in the second non-display area B2, and in this case, the switching unit 150 may be provided in the second non-display area B2.

Moreover, some of the second electrode lines 2TL may be connected to the first driver IC 300 through the first non-display area B1, and the other lines of the second electrode lines 2TL may be connected to the second driver IC 700 through the second non-display area B2. In this case, the switching unit 150 may be provided in each of the first non-display area B1 and the second non-display area B2.

Hereinafter, as illustrated in FIGS. 2, 7 and 8, the display device where the second electrode lines 2TL are connected to the first driver IC 300 in the first non-display area B1 and the switching unit 150 is provided in the first non-display area B1 will be described as an example of the present disclosure.

The switching unit 150 may include a switching line 151, provided in the first non-display area B1 to which the second electrode lines 2TL extend, and a plurality of switching transistors 152 respectively connected to the second electrode lines 2TL.

A gate of each of the switching transistors 152 may be connected to the switching line 151.

The switching line 151 may be connected to the first controller 410 through a switching signal supply line 140. The switching signal SS output from the first controller 410 may be supplied to the switching line 151 through the switching signal supply line 140.

Each of the pixels P may include the pixel electrode PE.

The pixel electrode PE may be connected to the driving transistor T which is connected to the data line DL and the gate line GL. A data voltage supplied through the data line DL may be charged into a gap between the pixel electrode PE and the first electrode 110 or the second electrode 120 while the gate pulse is being supplied to the gate line GL.

A first terminal and a second terminal of each of the switching transistors 152 may be connected to the second electrode line 2TL, and a third terminal used as a gate may be connected to the switching line 151.

The switching transistors 152 may be controlled along with the driving transistors T. Accordingly, the switching transistors 152 may be configured in a structure which is the same as that of each of the driving transistors TS.

However, the present embodiment is not limited thereto. Therefore, a structure of each of the switching transistors 152 may be variously modified.

As described above, the display panel 100 according to the present disclosure may include: the first electrodes 110 that are provided in the display part displaying an image and are used as the common electrodes and the touch electrodes; the second electrodes 120 which are arranged alternately with the first electrodes 110 in the vertical direction and the lateral direction; the first electrode lines 1TL that extend to the non-display part B disposed outside the display part A and are connected to the first electrodes 110 in a one-to-one correspondence relationship; and the second electrode lines 2TL that extend to the non-display part B and the first electrode lines 1TL connected to the first electrodes 110 in a one-to-one correspondence relationship and are connected to at least two of the second electrodes 120 to supply the common voltage.

Particularly, in the display panel applied to the display device according to the first embodiment of the present disclosure illustrated in FIGS. 2, 7 and 8, each of the second electrode lines 2TL may zigzaggedly connect the second electrodes 120 which are provided along two vertical lines adjacent to each other in a first direction parallel to the first electrode lines 1TL. That is, a second electrode line 2TL may include a plurality of vertical and horizontal portions to form a zigzag pattern that connect together a plurality of second electrodes 120 that are located along two adjacent vertical columns of electrodes that include the plurality of second electrodes 120 that are connected to the second electrode line 2TL.

For example, in FIG. 2, one second electrode line 2TL may electrically connect six second electrodes 120 adjacent to each other along the first direction. In FIGS. 7 and 8, one second electrode line 2TL may electrically connect two second electrodes 120 adjacent to each other along the first direction.

The switching unit 150 that turns on/off each of the second electrode lines 2TL may be provided in the first non-display area B1. The switching unit 150 may include the switching line 151 and the switching transistor 152, and the switching transistor 152 may be connected to the switching line 151 and the second electrode line 2TL.

In the image display period, the first controller 410 may supply the switching signal SS to the switching line through the switching signal supply line 140.

The switching transistor 152 may be turned on by the switching signal SS, and thus, the common voltage output from the first driver IC 300 may be supplied to the second electrodes 120, connected to the second electrode line 2TL, through the second electrode line 2TL.

In this case, the first driver IC 300 may supply the common voltage to the first upper electrode 110a, connected to the first upper electrode line 1TLa, through the first upper electrode line 1TLa.

As described above and illustrated in FIG. 2, some of the first electrode lines 1TL and at least one of the second electrode lines 2TL may extend to the first non-display area B1 of the non-display part B disposed on one side of the display part A, and the other first electrode lines 1TL may extend to the second non-display area B2 of the non-display part B facing the first non-display area B1.

One of the second electrode lines 2TL may be one of at least two auxiliary electrode lines configuring one of the first electrode lines 1TL.

To provide an additional description, the second electrode line 2TL may be one of at least two auxiliary electrode lines configuring an electrode line group TLG including the first electrode line 1TL.

For example, the second electrode line 2TL illustrated in FIG. 7 may be one of the three auxiliary electrode lines 1L, 2L and 3L configuring the electrode line group TLG illustrated in FIG. 6. In this case, in FIG. 7, the first upper electrode line 1TLa adjacent to the second electrode line 2TLa may be an auxiliary electrode line except an auxiliary electrode line corresponding to the second electrode line 2TLa among the three auxiliary electrode lines 1L, 2L and 3L configuring the electrode line group TLG.

To provide an additional description, the second electrode line 2TL and the first upper electrode line 1TLa adjacent to the second electrode line 2TLa illustrated in FIG. 7 may configure one electrode line group TLG.

Moreover, the second electrode line 2TLa may be configured by connecting a plurality of auxiliary electrode lines included in pixels. In this case, an auxiliary electrode connection line for connecting the auxiliary electrode lines may be provided in a direction parallel to the gate line GL.

However, the present embodiment is not limited thereto. For example, the second electrode line 2TL illustrated in FIG. 8 may be one electrode line groups TLG, and in this case, the first electrode line 1TL may be one electrode line group TLG.

Moreover, the switching unit 150 may be provided in the display part A in addition to the first non-display area B 1. Particularly, the switching transistor 152 may be provided between two adjacent second electrodes 120.

In this case, in the touch sensing period, the second electrodes 120 may be electrically disconnected from each other by the switching unit 150.

Figure 9:
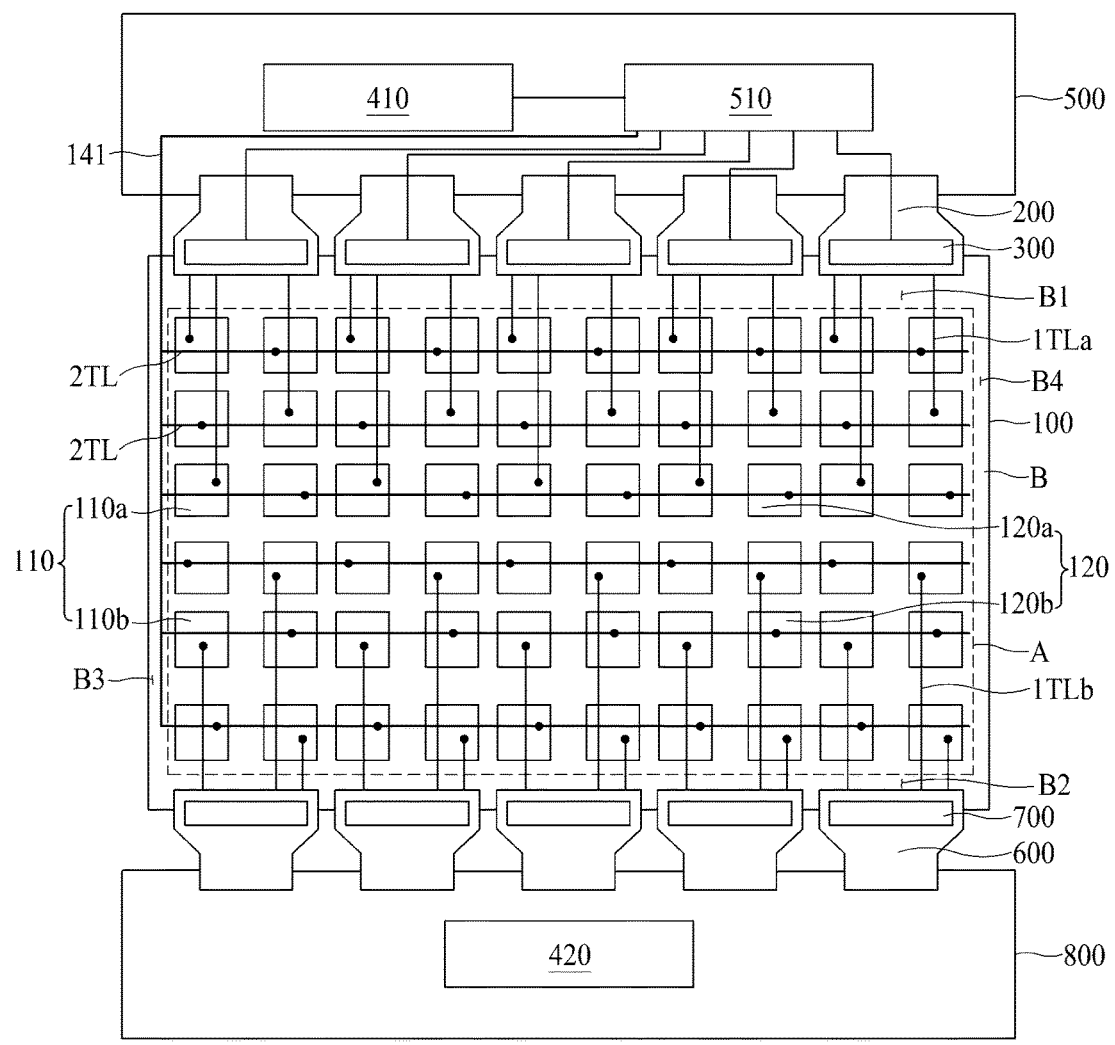
FIG. 9 is another exemplary diagram illustrating a configuration of a display device according to an embodiment of the present disclosure.

FIG. 9 is another exemplary diagram illustrating a configuration of a display device according to an embodiment of the present disclosure. In the following description, details which are the same as or similar to the details described above with reference to FIGS. 2 to 8 are omitted or will be briefly described.

The display device according to an embodiment of the present disclosure, as illustrated in FIG. 9, may include: a display panel 100 that includes a display part A displaying an image and a non-display part B disposed outside the display part A; a driver IC that is included in the display panel 100, supplies a common voltage or a touch signal to a plurality of first electrodes 110 used as common electrodes, and supplies the common voltage to a plurality of second electrodes 120 included in the display panel 100; a controller that drives the driver IC; and a gate driver (not shown) that is driven by the controller to sequentially output a gate pulse to a plurality of gate lines included in the display panel 100.

The display panel 100 may include: the first electrodes 110 that are provided in the display part A displaying an image and are used as the common electrodes and the touch electrodes; the second electrodes 120 which are arranged alternately with the first electrodes 110 in a vertical direction and a lateral direction; a plurality of first electrode lines 1TL that extend to the non-display part B disposed outside the display part A and are connected to the first electrodes 110 in a one-to-one correspondence relationship; and a plurality of second electrode lines 2TL that extend to the non-display part B and the first electrode lines 1TL connected to the first electrodes 110 in a one-to-one correspondence relationship and are connected to at least two of the second electrodes 120 to supply the common voltage.

Each of the second electrode lines 2TL may extend in a second direction vertical to the first upper electrode lines 1TLa and the first lower electrode lines 1TLb. For example, in FIG. 9, the first upper electrode lines 1TLa and the first lower electrode lines 1TLb may be arranged in parallel with the data lines DL, and the second electrode lines 2TL may be arranged in parallel with the gate lines GL disposed vertically to the data lines DL.

In this case, as illustrated in FIG. 9, the second electrode lines 2TL may alternately connect the second electrodes 120 along the second direction.

The common voltage output from the first common voltage supply unit 510 may be supplied to the second electrodes 120 through the second electrode lines 2TL.

The first common voltage supply unit 510 may output the common voltage according to control by the first controller 410 in the image display period.

The common voltage supplied to the second electrode lines 2TL through a common voltage supply line 141 may be supplied to the first driver IC 300. For example, the first common voltage supply unit 510 may supply the common voltage to the first driver IC 300.

In this case, in the image display period, the first driver IC 300 may supply the common voltage to the first upper electrodes 110a through the first upper electrode lines 1TLa according to the touch synchronization signal, and in the touch sensing period, the first driver IC 300 may supply the touch signal to the first upper electrodes 110a through the first upper electrode lines 1TLa. In the image display period, when the common voltage is supplied to the first upper electrodes 110a through the first upper electrode lines 1TLa, the first driver IC 300 may supply the common voltage to the second electrodes 120 through the second electrode lines 2TL.

Moreover, the switching unit 150 described above with reference to FIGS. 2, 7 and 8 may be provided in the display part A of the display panel 100 illustrated in FIG. 9.

Particularly, the switching transistor 152 may be provided between two adjacent second electrodes 120. The switching line 151 may be disposed in parallel with the second electrode line 2TL. The switching transistor 152 provided between two adjacent second electrodes 120 may be turned on/off by the switching signal SS supplied through the switching line 151 from the switching signal supply line 140.

Therefore, in the touch sensing period, the second electrodes 120 may be electrically disconnected from each other by the switching unit 150.

The present embodiment described above will be briefly summarized below.

According to the present embodiment, the number of first electrode lines connected to a driver IC is reduced.

Accordingly, the number of the driver ICs equipped in the display panel 100 is reduced.

Moreover, it is not required that the electrode line group TLG included in the display panel 100 is provided in a whole portion of the display panel 100. Accordingly, a transmittance of the display panel 100 is enhanced.

In the present embodiment, whether the second electrode 120 is touched may be determined by using a variation rate of a capacitance of each of the first electrodes 110 near the second electrode 120 which is not connected to the first electrode line. For example, when the second electrode 120 is touched, a variation rate of a capacitance which occurs in each of the first electrodes 110 near the second electrode 120 may differ from a variation rate of a capacitance occurring in an untouched first electrode and a variation rate of a capacitance occurring in a touched first electrode. Accordingly, whether the second electrode 120 is touched may be determined by using a difference between the variation rates.

In this case, a size of each of the first electrodes 110 and a size of each of the second electrodes 120 may be differently set for facilitating an operation of determining whether the second electrode is touched or enhancing an accuracy of an operation of determining whether there is a touch, based on a difference between capacitance variation rates.

If the second electrode line 2TL is used as at least one of the auxiliary electrode lines configuring the electrode line group TLG, the number of the first electrode lines 1TL (i.e., the number of the electrode ling groups TLG) connected to the driver IC is reduced by ½ in comparison with the related art display device.

The second electrode line 2TL, as illustrated in FIG. 2, may electrically connect the second electrodes 120 which are arranged in a zigzag type.

Moreover, as illustrated in FIG. 9, the second electrode line 2TL may electrically connect the second electrodes 120 which are arranged along the gate line GL. In this case, a common electrode line provided in the display panel 100 may be used as the second electrode line 2TL.

In the above-described embodiment of the present disclosure, the second electrodes 120 are used only as the common electrode supplied with the common voltage. However, in the another embodiment of the present disclosure, the second electrodes 120 may be used as a touch electrodes in order to enhance an accuracy of an operation of determining whether there is a touch. For example, in the touch sensing period, the touch signal may be supplied to the second electrodes 120 as well as the first electrodes 110, and the touch sensing unit may determine whether there is a touch by using sensing signals transferred from the first electrodes 110 and second electrodes 120.

As described above, according to the embodiments of the present disclosure, the number of the first electrode lines connected to the driver IC is reduced.

Therefore, the number of the driver ICs equipped in the display panel 100 is reduced.

Moreover, it is not required that the electrode line group TLG included in the display panel 100 is provided in a whole portion of the display panel 100. Accordingly, a transmittance of the display panel 100 is enhanced.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display panel comprising:
   a plurality of first electrodes provided in a display part of the display panel, the plurality of first electrodes used as a common electrode for displaying an image and the plurality of first electrodes used as a touch electrode for sensing touch;
   a plurality of second electrodes provided in the display part of the display panel, the plurality of second electrodes used as the common electrode for displaying the image and the plurality of second electrodes used as the touch electrode for sensing touch;
   a plurality of first electrode lines extending to a non-display part of the display panel that is disposed outside of the display part, each of the plurality of first electrode lines connected to a corresponding one of the plurality of first electrodes in a one-to-one correspondence relationship; and
   a plurality of second electrode lines extending to the non-display part, each of the plurality of second electrode lines connected to a corresponding at least two of the plurality of second electrodes,
   wherein at least one of the plurality of first electrode lines extends along a first direction and overlaps with at least one of the plurality of second electrode lines which extends along a second direction,
   wherein the at least one of the plurality of first electrode lines overlaps with at least one of the plurality of second electrodes, and the at least one of the plurality of first electrode lines overlaps with at least two of the plurality of the first electrodes,
   wherein the at least one of the plurality of second electrode lines overlaps with at least two of the plurality of second electrodes, and the at least one of the plurality of second electrode lines overlaps with at least two of the plurality of the first electrodes.

2. The display panel of claim 1, further comprising:
   a plurality of data lines extending along the first direction and a plurality of gate lines extending along the second direction,
   wherein the plurality of first electrode lines overlap with the plurality of gate lines and the plurality of second electrode lines overlap with the plurality of data lines.

3. The display panel of claim 1, wherein the at least one of the plurality of second electrode lines is electrically connected to all of the plurality of second electrodes disposed in one row of the display panel.

4. The display panel of claim 1, wherein the at least one of the plurality of second electrode lines overlaps with all of the plurality of first electrodes disposed in one row of the display panel.

5. The display panel of claim 1, wherein at least another one of the plurality of first electrode lines is not overlapped with the plurality of second electrode lines.

6. The display panel of claim 1, wherein at least another one of the plurality of second electrode lines is not overlapped with the plurality of first electrode lines.

7. The display panel of claim 1, wherein the plurality of first electrode lines supply a common voltage to the plurality of first electrodes during a display period and the plurality of second electrode lines supply the common voltage to the plurality of second electrodes during the display period; and
   wherein the plurality of first electrode lines supply a touch signal to the plurality of first electrodes during a touch sensing period.

8. The display panel of claim 7, wherein the common voltage is supplied to the second electrode lines through a common voltage supply line disposed in the non-display part of the display panel.

9. A display device comprising:
   a display panel including a display part displaying an image and a non-display part disposed outside the display part and not displaying an image;
   a driving circuit unit supplying a common voltage to at least one first electrode and at least one second electrode during a display period, and supplying a touch signal to the at least one first electrode during a touch sensing period and refraining from supplying the touch signal to the at least one second electrode during the touch sensing period; and
   a controller driving the driving circuit unit,
   wherein the display panel comprises:
   a plurality of first electrodes provided in the display part of the display panel, the plurality of first electrodes used as a common electrode for displaying the image and the plurality of first electrodes used as a touch electrode for sensing touch;
   a plurality of second electrodes provided in the display part of the display panel, the plurality of second electrodes used as the common electrode for displaying the image and the plurality of second electrodes used as the touch electrode for sensing touch;
   a plurality of first electrode lines extending to the non-display part of the display panel that is disposed outside of the display part, each of the plurality of first electrode lines connected to a corresponding one of the plurality of first electrodes in a one-to-one correspondence relationship; and
   a plurality of second electrode lines extending to the non-display part, each of the plurality of second electrode lines connected to a corresponding at least two of the plurality of second electrodes,
   wherein at least one of the plurality of first electrode lines extends along a first direction and overlaps with at least one of the plurality of second electrode lines which extends along a second direction,
   wherein the at least one of the plurality of first electrode lines overlaps with at least one of the plurality of second electrodes, and the at least one of the plurality of first electrode lines overlaps with at least two of the plurality of the first electrodes,
   wherein the at least one of the plurality of second electrode lines overlaps with at least two of the plurality of second electrodes, and the at least one of the plurality of second electrode lines overlaps with at least two of the plurality of the first electrodes.

10. The display device of claim 9, further comprising:
a plurality of data lines extending along the first direction and a plurality of gate lines extending along the second direction,
wherein the plurality of first electrode lines overlap with the plurality of gate lines and the plurality of second electrode lines overlap with the plurality of data lines.

11. The display device of claim 9, wherein the at least one of the plurality of second electrode lines is electrically connected to all of the plurality of second electrodes disposed in one row of the display panel.

12. The display device of claim 9, wherein the at least one of the plurality of second electrode lines overlaps with all of the plurality of first electrodes disposed in one row of the display panel.

13. The display device of claim 9, wherein at least another one of the plurality of first electrode lines is not overlapped with the plurality of second electrode lines.

14. The display device of claim 9, wherein at least another one of the plurality of second electrode lines is not overlapped with the plurality of first electrode lines.

15. The display device of claim 9, wherein the plurality of first electrode lines supply the common voltage to the plurality of first electrodes during a display period and the plurality of second electrode lines supply the common voltage to the plurality of second electrodes during the display period; and
wherein the plurality of first electrode lines supply the touch signal to the plurality of first electrodes during a touch sensing period.

16. The display device of claim 15, wherein the common voltage is supplied to the second electrode lines through a common voltage supply line disposed in the non-display part of the display panel.

* * * * *